United States Patent

Kallenbach

[11] Patent Number: 5,348,051
[45] Date of Patent: Sep. 20, 1994

[54] FLEXIBLE SWIMMING POOL CLEANER HOSE

[76] Inventor: Dieter H. F. Kallenbach, Plot 8, 9th Street, Chartwell, Transvaal Province, South Africa

[21] Appl. No.: 17,144

[22] Filed: Feb. 12, 1993

Related U.S. Application Data

[63] Continuation-in-part of Ser. No. 825,009, Jan. 24, 1992, abandoned.

[51] Int. Cl.⁵ ............................. F16L 9/18; F16L 9/00
[52] U.S. Cl. ................................. 138/109; 138/121; 138/155; 138/173
[58] Field of Search .............. 39/121, 122, 109, 155, 39/120, 173; 285/333.4, 903, 9.2, 382

[56] References Cited

U.S. PATENT DOCUMENTS

| | | |
|---|---|---|
| D. 206,236 | 11/1966 | Seckel et al. . |
| 942,466 | 12/1909 | Schnuerer . |
| 954,202 | 4/1910 | McIntyre . |
| 2,142,149 | 1/1939 | Replogle . |
| 2,299,520 | 10/1942 | Yant . |
| 2,903,007 | 3/1960 | Anderson et al. .................. 138/121 |
| 2,966,372 | 12/1960 | Phillips . |
| 2,995,151 | 8/1961 | Lockwood . |
| 3,076,669 | 2/1963 | Schlein . |
| 3,201,723 | 8/1965 | Martin et al. ..................... 138/122 |
| 3,234,969 | 2/1966 | Du Mont . |
| 3,738,394 | 6/1973 | Westerbarkey ..................... 138/122 |
| 3,758,139 | 9/1973 | Meserole . |
| 3,794,080 | 2/1974 | Huston et al. ..................... 138/121 |
| 3,838,713 | 10/1974 | Tubbs . |
| 3,897,090 | 7/1975 | Maroschak ........................ 138/121 |
| 3,926,222 | 12/1975 | Shroy et al. ...................... 138/122 |
| 3,929,359 | 12/1975 | Schmunk et al. . |
| 3,958,425 | 5/1976 | Maroschak . |
| 4,082,327 | 4/1978 | Sting et al. . |
| 4,327,776 | 5/1982 | Meserole .......................... 138/121 |
| 4,362,187 | 12/1982 | Harris et al. ...................... 138/122 |
| 4,865,362 | 9/1989 | Holden . |
| 5,027,665 | 7/1991 | Hayward . |

FOREIGN PATENT DOCUMENTS

2146726  3/1973  Fed. Rep. of Germany .
1247652 10/1960  France .

*Primary Examiner*—James E. Bryant, III
*Attorney, Agent, or Firm*—Kilpatrick & Cody; 10

[57] ABSTRACT

A flexible hose particularly suitable for use with automatically operated swimming pool cleaners, the hose being blow moulded from suitable plastics material such that separate lengths can be cut with each length having an integral coupling component at each end. Preferably there will be a male component at one end and a female component at the other end.

9 Claims, 2 Drawing Sheets

FLEXIBLE SWIMMING POOL CLEANER HOSE

This application is a continuation-in-part of co-pending application Ser. No. 07/825,009, filed Jan. 24, 1992, having the same title, now abandoned.

INTRODUCTION

This invention relates to flexible hose and more particularly to hose that is used for suction cleaners such as vacuum cleaners and especially but not confined to swimming pool cleaner hose.

BACKGROUND OF THE INVENTION

Flexible hose of plastics material has been used for many years to facilitate the operation of swimming pool cleaners. Where these cleaners are of the kind which operate automatically through the pool filtration system it has been found that the characteristics of the hose have an important influence on the operation of the pool cleaner.

The hose presently available is made to a corrugated longitudinal cross-section to provide radial stiffness to the hose with flexibility both along and transverse to the axis of the hose.

To date the hose used with swimming pool cleaners has been made from extruded plastics material and this inherently requires that the hose be made with two parts which are adhered together in the manufacturing process. This has the disadvantage that the manufacture makes it impossible to have a constant wall thickness for the hose. This can result in either an undesirable stiffness against flexing of the hose or alternatively a tendency for the hose to collapse under the internal reduced pressure experienced during use. The corrugations follow a helical path and this also has an adverse effect on the desired flextural characteristics.

The manufacturing technique enables the hose to be made in a continuous length but this necessitates cutting of the hose into appropriate lengths. However a further disadvantage is that male or female couplings components must be separately manufactured and fitted or moulded to the ends of the tube lengths.

Several different recipes of plastics material are used and these have been found to enable proper use of the swimming pool cleaner to be obtained. Not all hoses are suited to all cleaners but the appropriate recipe is readily ascertainable by persons skilled in the art.

The hoses are made to a compromise to give reliable use over a reasonable period of time and at reasonable cost.

OBJECT OF THE INVENTION

It is the object of the present invention to provide a flexible hose for the purposes above set forth which will avoid the disadvantages referred to.

SUMMARY OF THE INVENTION

According to this invention there is provided a length of flexible hose of corrugated form blow moulded from suitable plastics material to have an integral male coupling component at one end and a female coupling component at the other, the male component having a plurality of outwardly extending rings spaced apart along the length thereof of decreasing diameter towards the free end and the female coupling component providing a sleeve to extend over the male component with the male component more radially rigid than the female component.

Further features of this invention provide for the wall thickness of the hose lengths to be constant throughout and for the wall of the female coupling component to be planar.

Alternatively the wall thickness of the coupling components can be made thicker or thinner than the remainder of the hose length.

The hose will be produced as a continuous length which is cut to the required length as it progresses from the blow moulding equipment.

The invention also provides the rings to have their free peripheries of narrow cross-section and of generally triangular shape and for each ring to provide a pair of peripheral substantially line contact surfaces spaced apart.

BRIEF DESCRIPTION OF THE DRAWINGS

Embodiments of this invention are described below with reference to the accompanying drawings in which.

All the Figures are in longitudinal cross-section.

DETAILED DESCRIPTION OF THE DRAWINGS

Known blow moulding equipment can be used to produce the flexible hose 1 shown on a continuous basis and in accordance with known techniques.

The mould into which the plastics material is introduced is intermittently interchanged in known manner so that at predetermined intervals the wall of the hose 1 is changed from corrugated section indicated at 2 alternatively to provide the wall sections indicated at 3 and 4.

The hose is made with a pair of walls sections 3 in back to back relationship followed by a predetermined length of normal corrugated hose and then a pair of wall sections 4 in back to back relationship. The hose is then cut at the join of each pair of sections 3 and 4. This can be done using a flying guillotine or in other known conventional manner.

It will be appreciated that when the hose is severed into separate lengths as indicated each length will have integral therewith a male coupling component on one end and a female component on the other.

The process enables the hose lengths to be made to meet a wide range of specifications both with regard to the material used and the wall thickness. It will also be appreciated that the wall thickness is constant. Thus different degree of flexibility, resistance to collapse and other characteristics can be obtained to meet specific requirements. The corrugations are formed as separate rings and do not follow the conventional helical path.

where however the wall thickness is made to a thickness which could result in coupling components which may be too soft to withstand normal use when handled during connecting or under reduced pressure during use it will be understood that proper control of the moulding equipment will enable the thickness of the wall of the hose to be increased automatically along those lengths which form the coupling components.

It will be appreciated that the wall of the coupling component is made at an angle to the axis of the hose and this angle is another variable which will be determined by the manufacturer. The material used for the hose, length of coupling component and wall thickness can all influence this angle so that a coupling which is easily connected and disconnected and provides a proper seal can be obtained.

Figure 1:
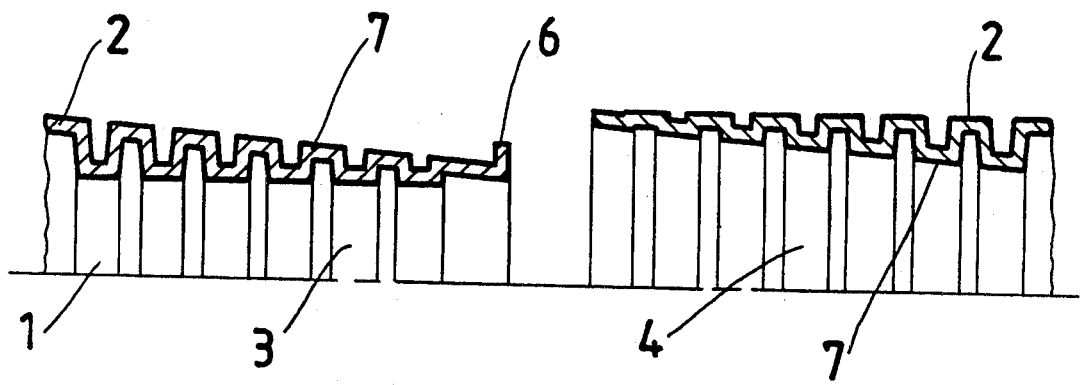
FIG. 1 illustrates two lengths of hose with one form of coupling components about to be connected together.
Figure 2:
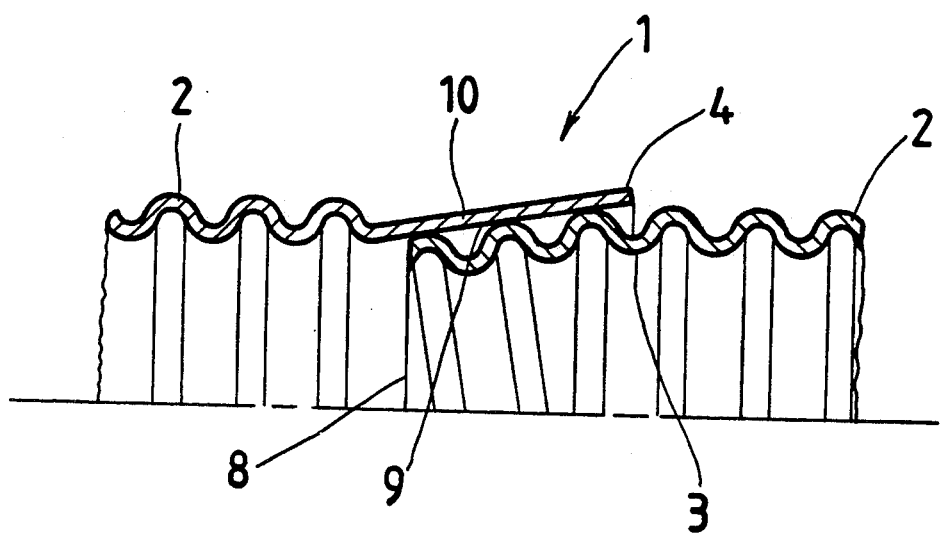
FIGS. 2 and 3 illustrate two lengths of hose connected together with alternative forms of coupling components.
Figure 3:
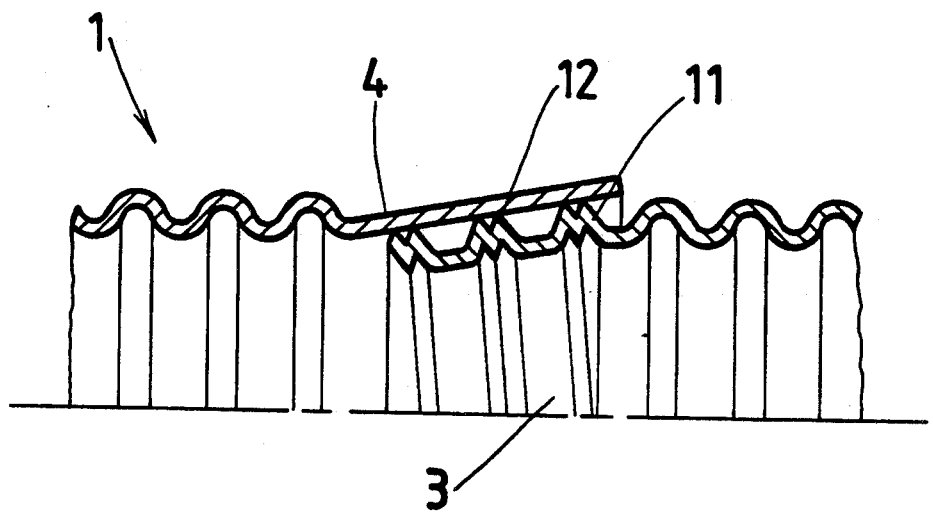

Referring to FIG. 1 where the same reference numerals are used for the same parts as in FIGS. 2 and 3 it will be seen that the lengths of the male and female components are substantially equal but as shown a resilient lip 6 is formed on the free end of the male component.

The sectional shape of the wall of the components is made to provide, progressing towards the free end of the component, truncated sections 7 of the normal corrugated shape of the hose. The sections are of greater truncation towards the free ends of the components.

However, the truncated sections 7 for the male coupling component are the inner sections of the corrugations while the sections 7 on the female component are provided by the outer sections of the corrugations.

The two sets of truncated sections thus give complementary outer and inner shapes the same as the normal corrugations of the hose.

To join two contiguous lengths of hose the male coupling component is inserted into the female component. The connection is completed with the lip 6 resiliently engaging behind the corrugation of the female component remote from the free end.

This retains the coupling components together during use and particularly when reduced pressure is relieved within the hose. The lip 6 acts in combination with the friction between the contacting surfaces of the male and female components to retain the components together.

The components can be pulled apart if necessary without damage due to the inherent resilience of the material from which the hose is manufactured.

The overall appearance of the hose in use in this embodiment is one of a continuous length of hose.

As shown in FIG. 2 the wall section 3 of the male coupling component has a corrugated wall but the corrugations are made to a serrated cross-section and the male coupling component is made to taper inwardly to the free end 8 at an angle of between 1° and 4°.

The serrated section will have a base length and height of about 3 mms.

The female coupling component 4 is made as a sleeve with plain inner and outer surfaces 9 and 10.

The sleeve will have an integral taper complementary to that of the male component and the length of these components can be of the order of 66 mms.

The wall thickness of both male and female sections can be the same as that of the corrugated section of each hose length.

The coupling components can be easily connected and the sleeve has a sufficient degree of flexibility to seat on the tips of the serrations of the male component. The latter are sufficiently rigid so that when reduced pressure is applied within the hose a good seal against the ingress of surrounding fluid is achieved.

In FIG. 3 the female component 4 is made as a plain walled sleeve the diameter of which increases towards its free end. The wall of this sleeve is sufficiently thin so that it will be caused to deform slightly during use when there is a reduced pressure existing with the hose consisting of several lengths coupled together. It may be of the same thickness or less than the thickness of the corrugated hose itself.

The male coupling component (3) has a series of rings (11) formed thereon and spaced apart from each other. Each ring (11) is of generally triangular transverse cross section so that the free end forms substantially a line contact against the inner wall of the sleeve forming the female component (4).

Preferably and as illustrated each ring has a pair of peaks (12) spaced apart so that two circular line contacts will occur for each ring within the sleeve.

The diameter of the rings decrease towards the free end of the male coupling component such that the peaks lie on a plane which is inclined at the same angle as that followed by the sleeve.

To couple two lengths of hose together the male component of one length is inserted into the female component of the contiguous length until the peaks (12) on the rings (11) firmly engage the inner wall of the sleeve (4). The peaks may deflect slightly during this operation which will result in a tendency for the components to remain engaged together.

Because of the substantially line contact between the peaks (12) of the rings (11) and the inner wall of the sleeve (3) a good seal between the components is promoted.

Of great consequence to proper sealing during use when the interior of the hose is under reduced pressure is that the male component should not collapse inwardly and the rings (11) provide sufficient stiffness to the component (3). On the other hand the thin walled unsupported sleeve of the outer component (4) tends to deflect inwardly under the pressure differential which exist between the inside and outside of the hose. These two factors ensure that a proper seal between the components is maintained.

The construction also compensates for irregularities which occur in the inner surface of the female sleeve member due to the method of manufacture.

It has been found that mixtures of EVA and low density polyethylene have proved effective in the manufacture of the hose according to this invention. Final mixture to meet particular requirements will be determined by those skilled in the art.

I claim:

1. A length of flexible hose of corrugated form with walls of generally constant thickness connected to an integral male coupling component at one end and a female coupling component at the other end, the male coupling component having a plurality of outwardly extending rings spaced apart along the length thereof of decreasing diameter towards the free end and the female coupling component providing a sleeve to extend over the male coupling component and the male coupling component is more rigid than the female coupling component defining a means allowing said female coupling component to deflect inwardly in response to reduced fluid pressure to provide a seal between said female coupling component and said male coupling component.

2. A length of flexible hose as claimed in claim 1 wherein the male coupling component is more radially rigid than the female coupling component, which comprises a flexible planar sleeve that grips the male coupling component at ambient pressure.

3. A length of flexible hose as claimed in claim 1 wherein each ring of the male coupling component provides a plurality of triangular cross-sectional peaks that provide a substantially peripheral line contact surface for engagement with the female coupling component.

4. A length of hose as claimed in claim 1 wherein the male coupling component has a serrated longitudinal profile and the female coupling is in the form of a sleeve having a plane inner surface.

5. A length of flexible hose as claimed in claim 1 in which the male coupling component carries a plurality of rings spaced apart the free peripheries of which are of narrow cross section and the female coupling component is in the form of a thin walled planar sleeve.

6. A length of flexible hose as claimed in claim 5 in which the rings are of generally triangular cross-sectional shape.

7. A length of flexible hose as claimed in claim 6 in which each ring provides a pair of peripheral substantially line contact surfaces spaced apart.

8. A length of hose as claimed in claim 1 wherein the coupling components are tapered complimentarily and the angle of the taper is between 1° and 4°.

9. A length of flexible hose as claimed in claim 1 wherein the walls of the male and female coupling components can be made of variable thickness.

* * * * *